UNITED STATES PATENT OFFICE.

ROBERT GRAHAM, OF HAYMOUNT, CUPAR FIFE, SCOTLAND.

FOOD PRODUCT AND PROCESS OF PRODUCING SAME.

1,264,876.

Specification of Letters Patent.  Patented Apr. 30, 1918.

No Drawing.  Application filed May 28, 1917.  Serial No. 171,437.

*To all whom it may concern:*

Be it known that I, ROBERT GRAHAM, a subject of the King of Great Britain, residing at Haymount, Cupar Fife, Fifeshire, Scotland, have invented certain new and useful Improvements in Food Products and Processes of Producing Same; and I do hereby declare the following to be a full, clear, and exact description of the invention, such as will enable others skilled in the art to which it appertains to make and use the same.

This invention relates to food products and processes of producing same; and it is principally concerned with the transformation or conversion of whole wheat, barley, rye, oats, and other cereals, into such form that substantially the entire grain or cereal is utilizable as food in the human digestive system. More particularly the invention relates to novel entire wheat food products, such as bread, biscuits, rusks, crackers, breakfast foods, and the like, and to processes of producing them, wherein all of the wheat berry is utilized and is present in the resultant product in forms which are soluble and assimilable to an extent heretofore unattainable. Moreover, the process of the invention, in its most advantageous embodiment, involves a systematic control and regulation of conditions throughout, for the purpose, among others, of conserving substantially unchanged the desirable mineral constituents of the original grain, and also those wholesome principles thereof which are commonly termed the "vitamins". The resultant bread or other product is characterized by its extremely high per centage of soluble and assimilable food constituents, by its fine flavor and palatableness, by its excellent keeping qualities, and by other desirable properties to be noted hereinafter. In its best form, it is also characterized by the fact that it contains all the constituents of the original grain or cereal in substantially the same proportions in which they were present in said grain or cereal, but in utilizable condition. While the invention in its broader aspects is not limited to the production of bread, or to bread from wheat, it finds its greatest present usefulness in that field and will be described more particularly in that connection. The broad principles of the invention are applicable, however, to the production of valuable food products from other grains, such as barley, rye, buckwheat, rice, and oats, for example, and may also extend to the treatment of maize, beans, peas, etc., where the disposition of a normally worthless cortex or branlike offal comes into question. As will be explained hereinafter, the invention may also be applied to the treatment of starchy tubers such as potatoes, cassava, etc., and even to vegetables like turnips, carrots, etc.

Various attempts have been made heretofore to utilize all the milling products of wheat, including the bran, in producing so-called entire wheat bread. But entire wheat bread as heretofore prepared has been unsatisfactory in many respects and its practical utility has been comparatively limited. Chief among its defects have been its relatively high content of insolubles, ascribable principally to the largely unchanged bran present in the finished loaf which is not in assimilable form and furthermore is apt to act detrimentally as a positive irritant in the digestive tract. Such bread is not particularly pleasant or palatable, is not easily masticated and digested, and in general is not satisfactory as an article of diet. Breakfast foods and the like containing various proportions of bran have also been proposed and have been characterized by similar defects and objections. Methods have been proposed heretofore for rendering available for food purposes the nitrogenous matters contained in the outer skin or bran of wheat and other grains and seeds, either by mechanical rupturing of the so-called aleurone cells or by chemical or enzymic solubleization of one kind or another; but no practical and satisfactory solution of the difficulty has as yet been put forward so far as I am aware.

By means of my invention, which will now be more fully explained, the difficulties formerly attending the attempted use of bran in bread and the like are effectively overcome in a thoroughly practical and scientific manner, with the resultant production of a food, specifically a bread, which is not only more wholesome, nutritious and appetizing than ordinary white bread, or than so-called entire wheat breads, heretofore known, but which can also be manufactured inexpensively.

Taking the production of a novel entire wheat bread of high digestibility and nutrition value as a typical and, at present, as the most important application of the principles of my invention, a method of producing such a bread, which has proved especially successful and desirable in actual practice, will now be explained in detail. Incidentally the preparation of a desirable breakfast food within the invention will also be described. It is to be clearly understood, however, that the practice of the invention is by no means limited to the specific details set forth in the explanatory example hereinafter given, but that such details merely characterize the best form of the invention now known to me.

In preparing a basis or foundation material by the use of which my novel bread and other products in question are produced, I first transform or convert the entire wheat berry into a material containing a large amount of soluble carbohydrates and proteids, and also containing highly active desirable enzyms, particularly diastatic and proteolytic enzyms. This foundation material may be described broadly as a malt or a malt-like product, and the method of producing it may, broadly speaking, be more or less similar in principle to the usual malting processes. For the purposes of this invention a product differing in specific properties from ordinary malt, and produced by a process differing in certain important respects from the usual malting processes, as will be more fully explained hereinafter, offers certain distinct advantages. But in the broader aspects of the invention, the use of ordinary malt is not intended to be excluded, though the special converted grain product to be described gives the best results.

Assuming the aforesaid transformed or converted entire wheat material to have been prepared, I next make use of the same in treating all the products obtained by milling wheat in such manner as to render the same thoroughly assimilable. In the most desirable embodiment of the invention, the various milling products are not all treated together, but are treated in several different portions as will be more fully hereinafter explained.

Having thus described in a general way the broad method of procedure where the invention is applied to the manufacture of a food product from wheat, the various steps involved will now be set forth in greater detail.

Preparation of the transformed or converted wheat material.

In preparing this material, it is most desirable to use a soft wheat, that is, a wheat high in starch and low in gluten. The wheat after being carefully cleaned is immersed in water for a period of time sufficient to saturate it, the surplus water is then drained off, and the grain is couched and allowed to warm to a point where it starts to germinate, at which point the enzyms actually contained in the grain are brought to the suitable degree of activity. In practice the attainment of a temperature of about 60° to 70° F. in the couch gives the best results for my purposes, although a reasonable variation from these temperature limits is permissible but less desirable. The grain is then spread out on a floor and is worked by plowing or turning it over at intervals sufficiently frequent to keep the temperature somewhat below the usual malting temperatures. In general, it may be said that the temperature of the grain should be kept so low, and the other conditions of germination should be so regulated and controlled, as to favor relatively slower germination than prevails in the usual malting process. In this way the development of the enzyms is gradual and their action in altering and rendering more digestible the starch, as well as the gluten and other nitrogeneous matters of the grain, is rendered especially effective. A particularly important function of the enzyms is their action on the bran layers of the wheat berries. Not only are the nitrogenous matters of the bran layers converted into more soluble and assimilable forms, but the cellulosic constituents of the bran are also modified and converted into a form in which they are assimilable to a certain extent at least, and the irritant and other undesirable characteristics of the bran are substantially eliminated. In order to attain these desirable results in the highest degree, the slow germination of the wheat should be permitted to continue under the conditions stated until the acrospire has attained a length of say two-thirds of the length of the grain, or thereabout. The carbohydrates present are wholly or largely transformed into sugars, such as grape sugar, etc., and the proteins are also altered to the desired extent. The length of time required, to effect the desired conversion varies with the character of the grain treated, the season of the year, and other conditions; but in most cases a period of from 10 to 17 days will suffice. When the proper degree of conversion has been effected the germination should be checked by transferring the grain to a kiln and passing through the mass of germinated wheat currents of dry air heated to a temperature of say 160–190° F. The slow drying of the converted wheat by means of the hot air is continued until the product is thoroughly dried, most desirably until the amount of moisture in the grain is below 3 per cent., or thereabout. During the drying care should be taken to keep the temperature low enough not to injure the enzyms, and yet sufficiently high to insure effective drying. The dried grain, still at a temperature of approximately 160–190° F. is then transferred to an air-tight bin or store, which may be of concrete, for example, and is allowed to remain there for a period of time sufficient to effect proper mellowing or ripening, that is to say, a further saccharification and solubleization of the substance of the wheat berry, under conditions insuring preservation of the enzyms and vitamins in a highly active state. This may desirably be from six weeks to three months, the latter length of time being the more desirable for present purposes. An even longer ripening period may sometimes be employed. During the storage period, the temperature of the grain gradually drops, but very slowly, to say 100° F. Where the ripening is much prolonged, the final temperature is of course lower. The attainment of this condition, which may be termed a super-ripening of the grain to prepare it for human consumption, can be readily ascertained by analysis of a test sample of the converted grain which should show a high degree of solubility.

After the converted or activated wheat product has been matured or ripened in the manner described, it is then ground to a flour or meal without removing the sprouts, and for this purpose concrete or bur-stones may be used.

Instead of carrying out the converting process as above described, the conversion may be effective in apparatus such as that disclosed in U. S. Patent No. 1,176,297 to Kirkpatrick, for example, which is especially suitable for present purposes in that it enables handling the grain under strictly sanitary conditions, and also enables accurate regulation and control of temperature, moisture, etc., and hence of the germinating process.

The above described converting method I believe to be novel, whether considered alone or in conjunction with the various other steps of the complete procedure herein disclosed, and it constitutes an important feature of the invention.

*Treatment of entire milled wheat with the converted wheat material.*

For best results, the wheat to be treated with the converted wheat material, prepared as above described, should be a strong wheat, such as a hard spring wheat of relatively high gluten content. According to the usual modern milling practice, such wheat is milled to give five separations, viz.: (1) superior white flour; (2) spring clear flour; (3) low grade flour; (4) middlings; and (5) bran. Thus, a bushel (60 lbs.) of wheat yields.

| | |
|---|---|
| Superior white | 28 lbs. |
| Spring clear | 6 " |
| Low grade | 6 " |
| Middlings | 6 " |
| Bran | 12 " |
| | 58 lbs. |

The loss as dust, etc., is 2 lbs.

In practising the invention according to the present specific example, the last two of these separations, that is to say, the middlings and bran, are combined and mixed with a quantity of the converted or transformed whole wheat flour or meal obtained as above described, and with an amount of water sufficient to form a soft paste. The proportion of the converted flour used may vary widely depending upon the speed at which it is desired to effect the subsequent solubleizing action of the bran and middlings. Expressed in parts by weight, a desirable formula for this mixture is as follows:

| | |
|---|---|
| Middlings | 6 lbs. |
| Bran | 12 " |
| Converted flour | 9 to 18 " |
| Water to give soft paste. | |

The ingredients are thoroughly mixed in a mixing machine and are heated to a temperature most desirably between about 100° and 150° F. 130° F. being particularly suitable, and is maintained in heated condition for a period of time sufficient to effect a substantial conversion or solubleization of the insoluble carbohydrates, albumins, etc., present in the mixture. During this period, which may be from 12 to 36 hours, or advantageously even longer, depending upon the proportion of converted flour used and the final degree of solubleization sought, the mixture is stirred occasionally. In the meantime, and before the expiration of this period, a white flour ferment or sponge is made up from the superior white, spring clear and low grade milling fractions above mentioned. I have found it especially desirable to make up the ferment or sponge in three portions corresponding to the three milling fractions named, and also to make the part sponges up in a predetermined succession rather than simultaneously. In this way the three sponges are of predetermined different ages when the conversion of the bran-middlings mixture has proceeded to the desired extent. The three sponges may be made up as follows:

Sponge No. 1.

Superior white flour_____ 28 lbs.
Water _____ 17–18 "
Yeast _____ ½ "

Sponge fermentation 1½ to 2 hours at approximately 81° F.

Sponge No. 2.

Spring clear flour_____ 6 lbs.
Water _____ 4 "
Yeast _____ ½ "

Sponge fermentation 1¼ to 1¾ hours at approximately 81° F.

Sponge No. 3.

Low grade flour_____ 6 lbs.
Water _____ 3½ "
Yeast _____ ⅛ "

Sponge fermentation 1 to 1½ hours at 81° F.

It will be observed that the superior white sponge, which is highest in gluten, ferments the longest; while the low grade sponge, which is lowest in gluten, has the shortest fermentation period. I find that by proceeding in this way a much stronger and better bodied loaf is finally obtained than if the three grades of flour were sponged together.

The above sponges having been so set as to mature when the conversion period of the bran-middlings mixture is completed, all three sponges when sufficiently matured and the converted bran-middlings mixture are worked up together with the requisite amount of water and salt to form a dough. The dough is thoroughly mixed and allowed to stand for about 2 hours, being cut back several times while rising. Ample time should be allowed at this stage to permit the excess of converted wheat material in the bran-middlings mixture to exercise a substantial solubleizing and converting action on the white flour of the admixed sponges. When ripe, the dough is cut up into pieces, scaled off, panned, and allowed to prove for say 30 minutes; and is then baked in a slow oven. For the best results the oven temperature should be about 350° F. at the commencement of the baking, and the temperature should be held at this point until the temperature at the center of the loaf approaches 150–160° F. The oven temperature should then be dropped to 290° F. and the baking operation completed without permitting the center of the loaf to attain a temperature substantially above 198° F. A careful regulation and control of the loaf temperature during baking is a very important factor in attaining the best results in accordance with this invention. By the use of low baking temperatures of the order indicated, destruction of the desirable enzyms and "vitamins", and undesirable changes in the constitution of the mineral compounds present is avoided. Most desirably the baking should occupy about 3½ to 4 hours, as this insures a still further conversion and solubleization of the bread constituents.

The bread produced as above described is readily distinguished from all other breads heretofore known by its physical characteristics and its constitution as shown by analysis. It is rather dark in color with a characteristic semi-transparency or translucency of crumb, and is of excellent texture. It has a delicious, sweet and nutty flavor and its high content of soluble carbohydrates and proteins is evidenced by the fact that it practically melts in the mouth without leaving more than a barely perceptible residue. The bread is masticated with noticeably greater ease than ordinary bread owing to the action of the enzyms which persist in the bread due to low baking temperature. The digestibility of the bread is very high owing particularly to the fact that digestion is materially aided by the enzyms present. The effective conversion or alteration of the bran, including the horny cellulosic bran integument, is evidenced by the entire absence of any irritating effect such as that characterizing bran breads heretofore known.

A bread produced in accordance with the invention but using proportions differing from those prescribed in the specific process above described and which had been allowed to become rather dry, showed the following composition upon analysis:

Moisture _____ 13.59%
Ash _____ 1.74% ⎫
Protein (nitrogen x 5.7)___ 13.1 % ⎪
Fat _____ 0.94% ⎬ Moisture free basis
Crude fiber_____ 1.45% ⎪
Water soluble carbohydrates _____ 44.15% ⎪
Insoluble carbohydrates___ 38.66% ⎭

It will be noted that in preparing the bread according to the specific process above described, the proportions of the original wheat berry constituents were preserved, and nevertheless a bread of high solubility was obtained, the percentage of soluble carbohydrates being ordinarily even higher than in the case of the bread whose analysis is given above, and not less than about 30 per cent. (on dry basis) as a minimum, where the invention is practised in the preferred manner. This particular proportioning constitutes an important feature of the invention in a desirable specific embodiment thereof; but it is not to be inferred that the invention is limited to these specific proportions. The degree of solubility can be very much increased by letting the mixture of bran, middlings and converted flour stand 36 hours or more, instead of 18 hours as was done in the case of the bread whose analysis is given above. In making the bread having the above analysis, a larger proportion of superior white flour and more converted entire wheat flour were employed than where the proportions correspond to the milling fractions as first described.

The intermediate product obtained by treating bran and middlings with what I call the converted flour constitutes in itself a valuable breakfast food, especially when the conversion period is prolonged. For example, a breakfast food obtained by a 30-hour conversion and dried for a further period of about 12 hours at about 130°–150° F. showed the following composition:

| | | |
|---|---|---|
| Moisture | 9.37% | |
| Ash | 3.76% | |
| Protein (nitrogen x 5.7) | 14.24% | Moisture free basis |
| Fat | 2.85% | |
| Fiber | 1.62% | |
| Water soluble carbohydrates | 58.79% | |
| Insoluble carbohydrates | 18.74% | |

This breakfast food is a friable granular material, of a delicious sweet flavor, very easily digestible, and highly nutritious.

As before stated, and as is evidenced from the foregoing description, the invention involves the application of certain principles in a broadly novel manner to the production of food materials, of which bread is merely typical, from food grains and seeds generally, and also from farinaceous tubers. The steps of the treatment require to be varied more or less according to the materials used; but in general, the broad principles herein disclosed are of wide application and comprises, in the most desirable form of the invention, the solubleization or conversion of bran or a bran containing material by the action of a malt or malt-like product which has been matured or super-ripened by maintaining it for a relatively long period of time at temperatures above atmospheric, the resultant mixture containing the altered bran material being ordinarily then utilized in conjunction with added vegetable material of suitable character for the production of an edible and palatable food product, characterized by a relatively large content of sugars and assimilable protein matter. The invention is therefore to be viewed in a broad light, and the claims hereinafter made are to be interpreted broadly. Moreover, the novelty of the process involved is not alone in the complete procedure herein disclosed, but the several steps thereof are also individually novel more or less broadly. It is to be noted also that the bread product produced as herein described is distinctly new in the art and broadly distinguishable by various characteristics above set forth and hereinafter recited in the claims. I believe it also to be broadly new to produce an edible bran product by treating bran, or bran-containing material, with a transformed or converted grain of high diastatic and peptic power, as above described, and that the product obtained by such treatment is also new. These and all other novel features of the invention hereinabove disclosed, considered individually or in partial or complete combination, are to be understood as intended to be covered by the annexed claims.

What I claim is:

1. The process of preparing an entire wheat bread which comprises treating a bran-containing material with a diastatic and peptic solubleizing agent, mixing the resultant material with a white flour ferment to form a sponge, forming a dough from said sponge and baking.

2. The process of preparing an entire wheat bread which comprises mixing wheat bran and middlings with a comminuted diastatic wheat product and water, maintaining the mixture in heated condition until the desired conversion has been effected, working up the resultant material into bread dough, and baking said dough.

3. The process of preparing food products from grain which comprises subjecting a bran-containing portion of the milled grain to the solubleizing and modifying action of a diastatic and proteolytic material, mixing with the resultant product a higher grade portion of the milled grain, and baking the mixture.

4. The process of preparing food products from grain which comprises subjecting bran and middlings to the solubleizing and modifying action of a diastatic and proteolytic wheat flour or meal admixed therewith, adding white flour to the mixture, doughing and baking.

5. The process of preparing an entire wheat bread which comprises commingling a highly diastatic and peptic entire wheat flour or meal with all the constituents of ordinary entire wheat flour, forming a dough from the mixture, and baking the dough.

6. The process of making bread which comprises mixing wheat bran and middlings with a prepared wheat flour or meal containing diastatic and proteolytic enzyms, and with water, maintaining the mixture at a temperature favorable to enzymic activity for a period of time sufficient for conversion and solubleization of a substantial proportion of the insoluble matters present, sponging the resultant product with yeast and white flour, and baking.

7. In the preparation of food products from cereals, the process which comprises malting a cereal, drying the malted cereal, and then maintaining it for not less than about six weeks at a temperature substantially above normal atmospheric temperature.

8. In the preparation of a food product from wheat, the process which comprises malting wheat, drying the malted wheat, and then maintaining it for about three months at temperatures gradually declining from about 200° F. to about 100° F.

9. The process of preparing food products which comprises converting a relatively soft wheat into a diastatic and peptic flour by subjecting the wheat to germinating conditions and then drying and grinding the converted product, mixing middlings and bran from hard spring wheat with a suitable proportion of said diastatic flour and water, and maintaining the mixture warm for several hours to effect a conversion of insoluble matters, making a ferment with flour from the higher grade milling fractions of said hard spring wheat, combining the ferment with the converted bran-middlings mixture to form a dough, and baking the dough.

10. The process of making bread which comprises mixing combined wheat bran and middlings with about 50 per cent. by weight of a converted whole wheat flour of high diastatic power and with water, maintaining the mixture in a heated condition but not substantially warmer than about 150° F. for from about 12 to 36 hours, approximately, to obtain a converted product, preparing separate ferments of wheat flours commonly graded as "superior white," "spring clear," and "low grade," successively in the order indicated, mixing said converted product and the ferments to form a dough, working up the resultant dough into loaves, and baking the loaves at a relatively low temperature.

11. The process of preparing food products which comprises mixing together bran, a ground malt and water, maintaining the mixture at a favorable converting temperature for an appropriate period of time, not substantially less than 12 hours, and drying the resulting product.

12. The process of preparing food products which comprises mixing together wheat bran, ground wheat malt and water, maintaining the mixture at a favorable converting temperature, not substantially above 150° F. until a substantial proportion of the insolubles present are solubleized, and baking the resultant product in a slow oven.

13. The process of preparing food products which comprises mixing together wheat bran, middlings, ground wheat malt and water, maintaining the mixture at a favorable converting temperature not substantially above 150° F. until a substantial proportion of the insolubles present are solubleized, and baking the resultant products in a slow oven.

14. The process of preparing food products which comprises forming a dough of flour and malt-like material, and baking the dough at relatively low oven temperature for at least about three and one-half hours.

15. The process of preparing a food product which comprises germinating grain more slowly than in the ordinary malting process, drying the resultant product and ripening it at a temperature above atmospheric.

16. The process of preparing a food product which comprises germinating wheat at a temperature below that favorable to most rapid germination, continuing the germination for from about 10 to 17 days, drying the germinated wheat, and ripening at a gradually decreasing temperature for from about six to twelve weeks.

17. As a new article of manufacture, an entire wheat bread of good body and relatively fine porous texture containing all the constituents of the wheat berry in substantially their original proportions but largely in soluble or assimilable form, the content of soluble carbohydrates being not substantially less than about 40 per cent. on a dry basis.

18. As a new article of manufacture, an entire wheat bread of good body and relatively fine porous texture containing all the constituents of the wheat berry but in such form that at least 30 per cent. (dry basis) are present as soluble carbohydrates.

19. As a new article of manufacture, a food product resulting from the treatment of bran with a malt and containing at least substantially 30 per cent. of soluble carbohydrates on a dry basis.

20. As a new article of manufacture, a food product resulting from the treatment of bran and middlings with a malt.

21. As a new article of manufacture, a food product prepared from grain, cereal, or other farinaceous material of the character described, characterized by its containing all the constituents of the original material in substantially the same proportions as they existed therein, but converted into such form that at least about 40 per cent. (dry basis) are present as soluble carbohydrates.

22. The process of making bread which comprises preparing separate sponges or ferments of different ages from different grades of flour according to the gluten content of the different grades, combining and working up the ferments or sponges into dough, and baking.

23. The process of preparing food products which comprises slowly germinating a cereal, stopping the germination and ripening the resultant material for at least approximately six weeks at a temperature somewhat above atmospheric, comminuting the ripened product, mixing therewith a farinaceous material, and maintaining the mixture for a suitable period of time under conditions favorable to conversion of said farinaceous material.

24. The process of preparing food products which comprises germinating grain relatively slowly, checking the germination at a stage while the enzymic activity is high, maintaining the grain in dry condition for a prolonged period at temperatures materially above that of germination, and subjecting material comprising bran to the solubleizing action of the resultant product.

25. The process of preparing food products which comprises germinating wheat under conditions favoring slow germination, checking the germination at a state while the enzymic activity is high and maintaining the grain in dry condition for a prolonged period at temperatures materially above that of germination, and subjecting material comprising wheat bran to the solubleizing action of the resultant product.

26. The process of preparing food products which comprises subjecting material comprising bran to the converting and solubleizing action of a malt matured or ripened by prolonged maintenance at temperatures above atmospheric.

27. The process of preparing food products which comprises subjecting a mixture comprising bran and middlings to the solubleizing action of a malt matured or ripened by prolonged maintenance at temperatures above atmospheric.

28. The process of preparing food products which comprises subjecting a mixture comprising bran and middlings to the solubleizing action of a malt matured or ripened by prolonged maintenance at temperatures above atmospheric, mixing the resultant product with a flour sponge to form a dough, maintaining the dough under conditions favorable to enzymic activity for a period of time sufficient to effect substantial further solubleization, and then slowly baking the dough.

29. The process of preparing food products which comprises subjecting material comprising bran to the converting and solubleizing action of a malt matured or ripened by prolonged maintenance at temperatures above atmospheric, and further heating the resultant product to obtain an edible and palatable food.

30. The process of preparing food products which comprises subjecting material comprising bran to the converting and solubleizing action of a super-ripened malt, admixing the resultant product with suitable vegetable material, permitting enzymic action to continue in the mixture, and subjecting to a low baking heat.

31. The process of making an entire wheat bread which comprises mixing with a bran-containing milling fraction, water and a diastatic meal or flour prepared from germinated wheat which has been matured or super-ripened by prolonged maintenance at temperatures above atmospheric, maintaining the mixture warm for a period of from about 12 to 36 hours or more, working the resultant material up into dough with white flour, allowing the dough to ripen thoroughly and finally baking at relatively low heat.

32. As a new article of manufacture, a baked food product comprising bran and middlings modified by treatment with a malt and containing about 50 per cent or more soluble carbohydrates on a dry basis.

33. As a new article of manufacture, entire wheat bread comprising white flour, bran and middlings in substantially the proportions obtained in milling the grain, but so altered in character that the bread shows a content of soluble carbohydrates not substantially less than about 30 per cent. on a dry basis and possesses a characteristic sweet and nutty flavor.

In testimony whereof I hereunto affix my signature.

ROBERT GRAHAM.